No. 689,134. Patented Dec. 17, 1901.
W. SEFTON.
GREENHOUSE, CONSERVATORY, OR OTHER GLASS STRUCTURE.
(Application filed June 21, 1901.)
(No Model.) 2 Sheets—Sheet 2.
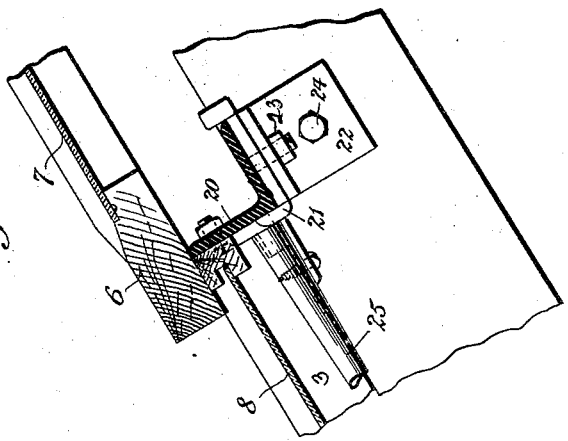
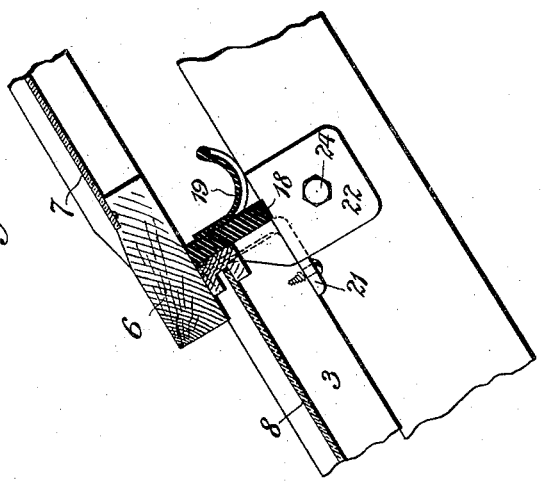
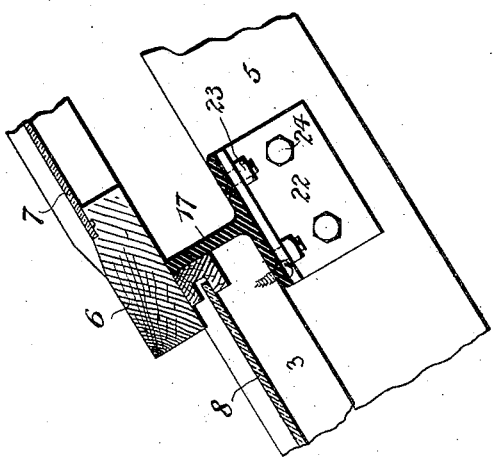
Witnesses:
John A. Rennie
George Barry Jr.
Inventor:
William Sefton
by attorneys

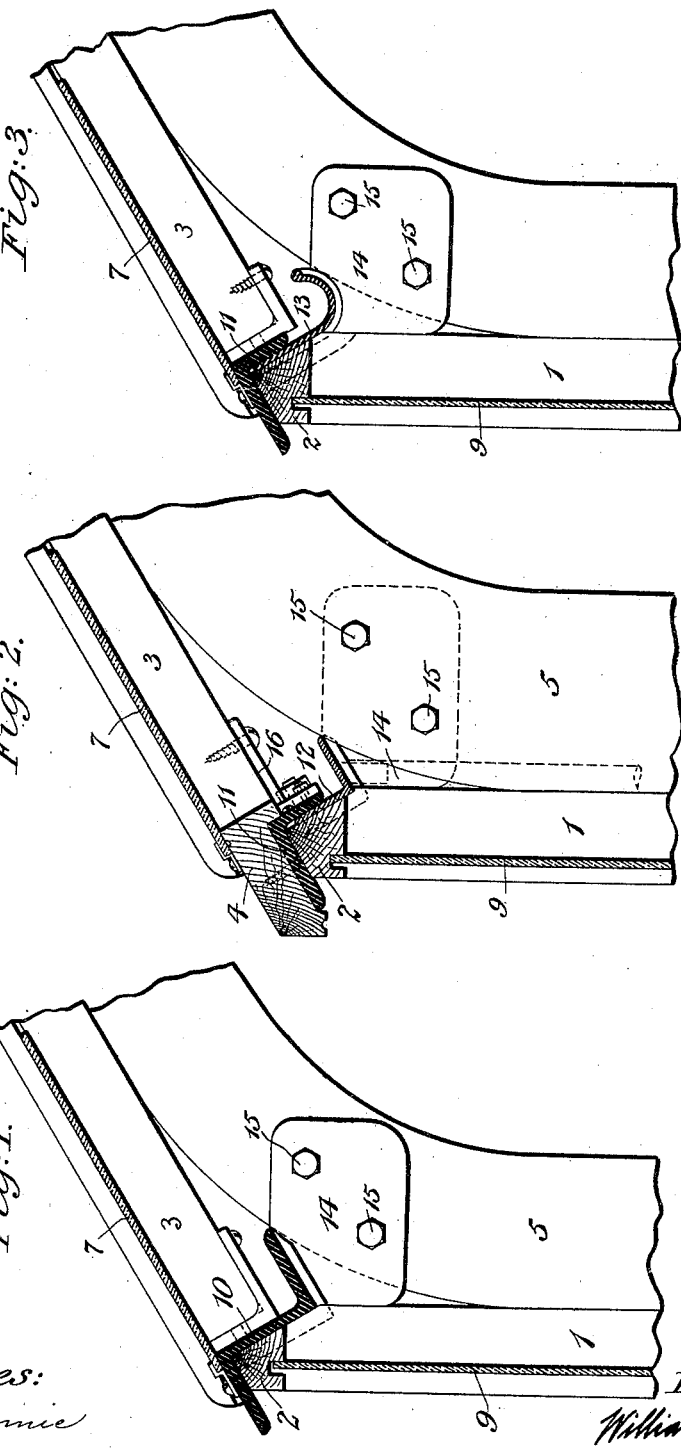

UNITED STATES PATENT OFFICE.

WILLIAM SEFTON, OF JERSEY CITY, NEW JERSEY, ASSIGNOR TO HITCHINGS & COMPANY, OF NEW YORK, N. Y., A CORPORATION OF NEW YORK.

GREENHOUSE, CONSERVATORY, OR OTHER GLASS STRUCTURE.

SPECIFICATION forming part of Letters Patent No. 689,134, dated December 17, 1901.

Application filed June 21, 1901. Serial No. 65,420. (No model.)

*To all whom it may concern:*

Be it known that I, WILLIAM SEFTON, a citizen of the United States, and a resident of Jersey City, in the county of Hudson and State of New Jersey, have invented new and useful Improvements in Greenhouse, Conservatory, or other Glass Structures, of which the following is a specification.

My invention relates to improvements in greenhouse, conservatory, and other glass structures, and has for its object to provide a gutter arranged to receive the water of condensation which forms on the under side of the roofs of the said structures.

A further object is to provide gutters located along the interior of the structure at the eaves-line and at a point in position to receive the drip from the ventilator.

A still further object is to provide a gutter which will not only receive the water of condensation from the under side of the roof of the structure, but will also serve as a connecting-beam for the rafters and as a support for the roof-bars.

Each of these gutters may be formed of a single beam of the desired shape in cross-section or of two beams rigidly secured together.

A practical embodiment of my invention is represented in the accompanying drawings, in which—

Figure 1 represents a cross-section at the eaves of a greenhouse or like structure with one form of my improved gutter in its position. Fig. 2 is a similar view showing another form of gutter. Fig. 3 is a similar view showing still another form of gutter. Fig. 4 is a detail cross-sectional view of a portion of the roof of a greenhouse or like structure at the junction of the free end of the ventilating-sash with the roof, showing one form of my improved gutter in its position. Fig. 5 is a similar view showing another form of gutter, and Fig. 6 is a similar view showing still another form of gutter.

The wooden glazing-bars of the side frame of the structure are denoted by 1, and the top longitudinal beam at the eaves-line is denoted by 2.

The wooden roof-bars of the structure are denoted by 3, and the longitudinal beam along their lower ends is denoted by 4. The iron rafters, which extend upwardly along the side and roof of the structure, are denoted by 5. The ventilating-sash is denoted by 6. The panes of glass in the ventilating-sash, the roof, and the side of the structure are denoted, respectively, by 7, 8, and 9.

The parts above described may be of the usual well-known construction in structures of this character.

I provide a suitably-shaped gutter, of metal or other suitable material, along the interior of the structure at the eaves-line for receiving the water of condensation which forms on the under side of the roof.

When a ventilator is used in connection with the roof, I also provide a gutter along the interior of the structure on the under side of the roof in position to receive the water of condensation which forms on and drips from the ventilator.

The gutter 10 (shown in Fig. 1) is of reverse angular or /\/ shape in cross-section, the under angle of the gutter resting upon the top beam 2 of the side frame of the structure and the upper angle forming a trough for receiving the water of condensation.

In the form shown in Fig. 2 the gutter comprises two angle-bars 11 12, bolted securely together along their overlapping sides, the trough for receiving the water of condensation being formed by the angle-bar 12, and in Fig. 3 the trough is shown as composed of a U-shaped bar 13, having one of its sides extended upwardly a considerable distance to overlap one of the sides of the angle-bar 11. These two bars 11 and 13 are rigidly secured together along their overlapping sides, and the bar 13 forms the trough for receiving the water of condensation. These gutters are connected to the rafters 5 by means of brackets 14, secured to the said rafters by bolts 15 and engaging the inner portions of the gutters.

The wooden roof-bars 3 are supported at their lower ends by the gutters and are rigidly secured thereto, preferably by brackets 16, bolted to the sides of the gutter and screwed to the said roof-bars and to the beam 4 when it is used.

In the structure shown in Fig. 4 I have represented a gutter 17 of ⊥ shape in cross-section. The trough for receiving the water of condensation which drips from the ventilator is formed between the web and the upper branch of the ⊥, while the upper ends of the roof-bar 3 are secured within the angle formed between the web and the lower branch of the ⊥.

In the form shown in Fig. 5 I have represented the gutter as comprising a straight bar 18 and a U-shaped bar 19, rigidly secured together, the U-shaped section 19 serving as a trough for receiving water of condensation from the ventilator.

I have shown in Fig. 6 a gutter formed by an angle-bar 20, the two branches thereof forming a trough for receiving the water of condensation from the ventilator.

In Fig. 4 the upper end of the roof-bar is shown as being screwed directly to the gutter 17, while in Figs. 5 and 6 the upper ends of the roof-bars 3 are secured to the gutters by means of brackets 21, secured to the said roof-bars and to the gutter.

The gutters are secured to the iron rafters 5 by means of brackets 22, bolted, as shown at 23, to the gutter and, as at 24, to the rafter.

An escape-pipe 25 may lead from the gutter at the required points for conveying the water from the gutter to any suitable point.

By the use of the structure as hereinabove described it will be seen that the two gutters serve the double purpose of receiving the water of condensation from the under side of the roof and the ventilator and also as connecting-bars for the iron rafters and as supports for the roof-bars.

It is evident that the gutters may be made in many different forms and that they may be made of any desired material without departing from the spirit and scope of my invention. Hence I do not wish to limit myself strictly to the structure herein set forth; but

What I claim is—

1. In a greenhouse or like structure, a roof, a side wall, a ventilator in the roof, a rafter extending upwardly along the side wall and roof, an interior gutter interposed between the lower end of the roof and the top of the side wall, a second interior gutter adjacent to the ventilator and brackets for securing the rafter to the two gutters, substantially as set forth.

2. In a greenhouse or like structure, a roof and a gutter comprising two angle-bars secured together, one of the bars serving as a trough for receiving the water of condensation which forms on the under side of the roof, substantially as set forth.

In testimony that I claim the foregoing as my invention I have signed my name, in presence of two witnesses, this 24th day of May, 1901.

WILLIAM SEFTON.

Witnesses:
 FREDK. HAYNES,
 C. S. SUNDGREN.